Jan. 2, 1968          D. R. TIMMONS          3,361,147
FASTENERLESS COUPLING MEANS FOR SHEET METAL DUCTING
AND THE METHOD OF MAKING AND ASSEMBLING THE SAME
Filed June 28, 1965
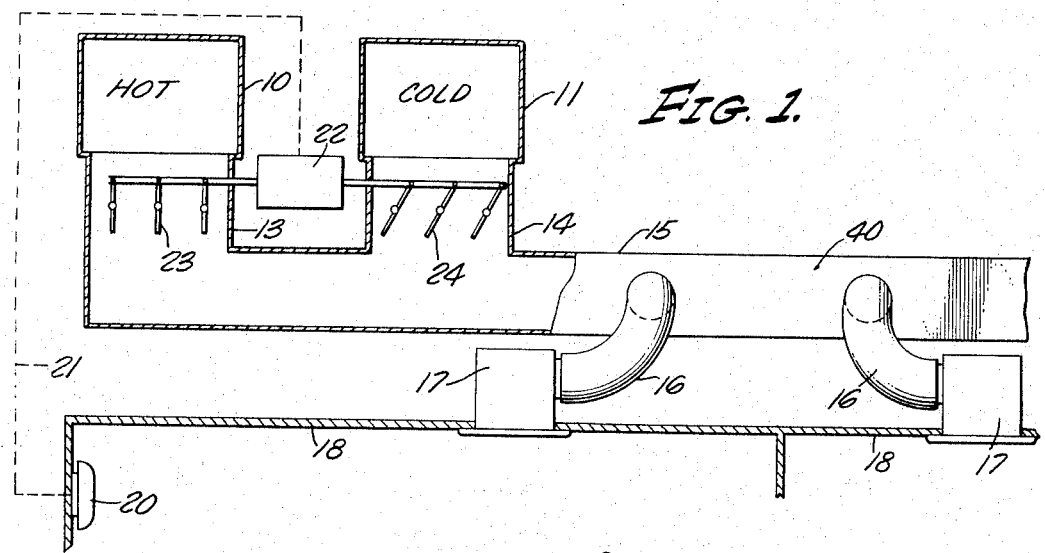
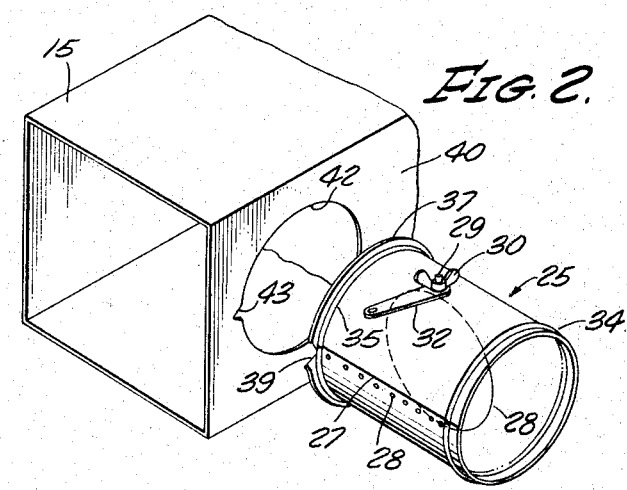
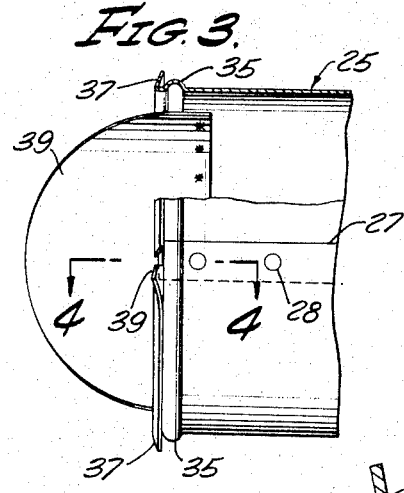
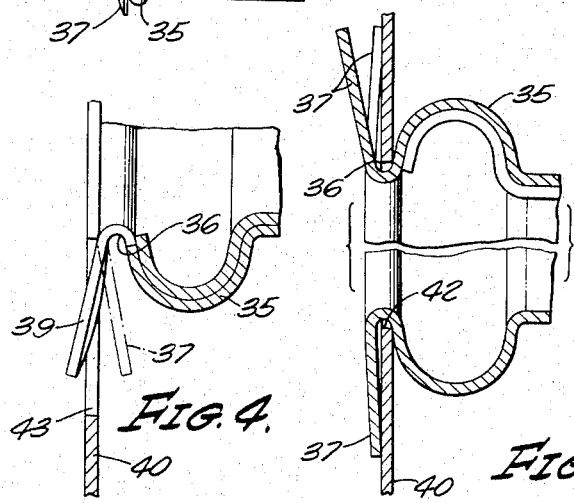
DAVID R. TIMMONS
INVENTOR.
BY
ATTORNEY

United States Patent Office

3,361,147
Patented Jan. 2, 1968

3,361,147
FASTENERLESS COUPLING MEANS FOR SHEET METAL DUCTING AND THE METHOD OF MAKING AND ASSEMBLING THE SAME
David R. Timmons, 968 Lyman,
Covina, Calif. 91722
Filed June 28, 1965, Ser. No. 467,340
6 Claims. (Cl. 137—15)

ABSTRACT OF THE DISCLOSURE

A sheet metal duct coupling comprising a cylindrical duct formed for rotary assembly into an opening in the flat side wall of another duct. The coupling junction includes a resilient flange which bears against the mating wall under pressure substantially throughout the circumference of the junction to provide a virtually fluid-tight fit. The junction includes a flow deflector for channeling variable quantities of the flow into the other duct depending upon the rotary adjustment of the parts. Substantial economies are achieved by forming portions of the coupling requiring forming apparatus at a permanent installation of such apparatus and performing other simpler operations and the assembly of the parts at the point of final use of the invention product.

---

This invention relates to couplings and more particularly to a simplified, economical, quickly fabricated and assembled sheet metal coupling and to the method of making and assembling the same at the point of installation using a minimum of equipment and low skill labor.

The installation of heating and cooling equipment in buildings of al sizes and types requires extensive use of customized sheet metal work and the use of large numbers of coupling or junction fittings distributed liberally throughout the system. It is difficult and often not feasible to make accurate and detailed plans for the ducting since not infrequently its location is subject to change as construction proceeds and as plans for use of the interior space are varied to meet the needs of both old and new tenants. These and other factors have heretofore necessitated the presence of extensive tinsmith forming and fabricating equipment directly on the building site and the manning of the equipment by skilled metal workers. This limits the use of the equipment to operations at the construction site and often leads to the need for duplicate equipment in order to meet the needs at the main shop and at various construction sites. Much time is lost by the skilled technicians in going to and from the site and in traveling between the equipment on the site and the actual installation areas of the building under construction.

To overcome the foregoing and many other related disadvantages of prior practices relating to the construction and installation of ducting, there is provided by the present invention a simple, versatile and improved coupling so designed that all operations requiring the use of forming machines and equipment and the use of skilled personnel are conducted at a permanent tinsmith facility along with all the other routine operations normally conducted there. The coupling comprises a female unit made in a tinsmith shop and then transported to the construction site for installation without need for any except the simplest of hand tools. These are handled by relatively unskilled labor employed full time for this purpose and familiar with regulations and safety precautions prevailing around buildings under construction. These workmen need but use tinsmith snips to cut a round opening in the main ducting following which they align the branchout duct with this opening and spin it about its own axis until the coupling flange is located interiorly of the main duct. This simple operation suffices to complete the installation of a substantially leakproof joint without need for fasteners or the use of clamps or other auxiliaries to hold the joint assembled. Flexible ducting is then coupled to the other end of the branchout and connected with an air-distributing fitting mounted in the wall of the room being serviced.

Accordingly, it is a primary object of the present invention to provide an improved, greatly simplified, highly effective sheet metal coupling for use between a main duct and a branchout therefrom.

Another object of the invention is the provision of an improved and lower cost method for fabricating sheet metal coupling units in a permanent facility and then transporting such units to a construction site and there using relatively unskilled labor to assemble the unit to a main duct.

These and other more specific objects wil appear upon reading the folowing specification and claims and upon considering in connection therewith the attached drawings to which they relate.

Referring now to the drawings in which a preferred embodiment of the invention is illustrated.

FIGURE 1 is a generally schematic representation of the air-distributing system for an air conditioned building including branchouts utilizing the invention fastenerless coupling;

FIGURE 2 is an exploded view in perspective and on an enlarged scale of a single coupling;

FIGURE 3 is a fragmentary view partially in section of a coupling end of branchout duct;

FIGURE 4 is a fragmentary view on an enlarged scale taken along line 4—4 on FIGURE 3, and showing the parts in registry but prior to being rotated into assembled position;

FIGURE 5 is a view similar to FIGURE 4 but showing the coupling parts fully assembled; and FIGURE 6 is a fragmentary view in section and showing the branchout duct just after its V-notch has been rotated a few degrees past initial engagement with the notched opening in the main duct.

Referring initially more particularly to FIGURE 1, there is shown a typical portion of the distributing ducts for a building air conditioning system. This system includes a hot air main 10 and a cold air main 11 each having separate connections 13, 14 with a temperate air distributor main 15. Opening from main 15 are branchouts 16, 16 each leading to an air distributor 17, 17 opening into the rooms 18 being conditioned. Temperature sensor means 20 located in the space being conditioned is connected through control leads 21 with servo regulator means 22 operating to control and regulate the flow control dampers 23, 24 for the respective hot and cold air supply ducts 13 and 14.

Typically, control 22 operates to open one set of dampers 23 as it closes down or throttles the position of the cold flow dampers 24. In this manner, air of the proper temperature desired in the space being conditioned is assured since each tenant can adjust sensor 20 to provide a desired temperature in his own quarters.

Referring now to FIGURE 2, it is pointed out that the temperate air-distributing main 15 is customarily formed of sheet metal and is rectangular in cross-section. The distributing ducts 16, on the other hand, are customarily made of flexible hose or ducting and are connected to the main through the female branchout coupling members designated generally 25 (FIGURE 2). This duct is made in one piece of sheet metal held together by a seam 27 and rivets 28, or by solder, brazing or the like. Preferably, and during the assembly operation, a butterfly valve 28 having a pintle 29 is loosely mounted in aligned openings formed in the ducting. Secured to one end of pintle 29, as by thumb screw 30, is an operating arm 32 for the valve. A cord, chain or the like may be secured to this arm, trained over pulleys and extended into the occupied space in order that the tenant may adjust the quantity of air flowing through the branchout if he so desires.

Desirably, the inlet end of unit 25 is provided with a baffle or flow diverter 39 here shown as comprising a semi-circular piece of sheet metal spot-welded, soldered, riveted or otherwise secured to the sidewall of the coupling member. This flow diverter projects into main 15 from the downstream entrance end of duct 25 when properly assembled and functions to divert air into the branchout. As will be evident, unit 25 can be rotated to the extent necessary to locate baffle 39 in proper position for the most effective diversion of the air stream into branchout 16.

After completion of seam 27, one end of the branchout duct is inserted in heavy-duty forming equipment and rotated to form a bead 34 encircling the outlet end and over which the flexible hose may be telescoped and clamped using a garter ring, tie wire or other means. A second bead 35 is also formed about the inlet end of the duct along with a deep narrow groove 36 opening radially outward. The exterior side wall of groove 36 is formed by a wide annular flange 37. This flange flares slightly toward the discharge end of the duct and so that its outer rim edge overlies groove 36. The stiffness but slight resiliency of this flange has an important purpose which will become evident presently.

After formation of groove 36 and flange 37, a V-notch 39 is cut into the flange with its apex opening into the bottom of groove 36. The opposite sides of this V-notch are deflected away from one another, as is indicated in FIGURES 4 and 5, the purpose of facilitating assembly of coupling unit 25 to main 15.

Coupling sections 25 are now transported to the installation site and to the assembly location in the building. The workman first scribes a circle in the side wall 40 of main 15 having a diameter corresponding with the diameter at the bottom of groove 36 in the branchout duct. Using tinner's circle-cutting snips, the workman then cuts out a disc from the duct wall along the scribed line and cuts a notch 43 opening through the edge of this opening.

The assembly of the coupling parts is accomplished simply by holding unit 25 in registry with opening 42 with V-notch 39 in flange 37 aligned with notch 43 in the main duct. Since the edges of notch 39 are deflected away from one another, rotation of duct 25 about its own axis serves to advance the edge of opening 42 along groove 36. The workman continues to apply rotary motion to the branchout for a full revolution and until flange 37 is located interiorly of wall 40. Owing to the slight resiliency and stiffness of flange 37, it will be apparent that the rim edges of the flange are then pressed in substantially fluidtight contact with the interior surface of wall 40 and likewise that the outer surface of wall 40 is held in pressure contact with the side of bead 35. A virtually leakproof coupling of very considerable mechanical strength is thereby provided in the brief period required to align and spin the parts into mating assembly.

Thereafter, a flexible distributing duct 16 is assembled over the outer end of coupling member 25 and the workman proceeds with the assembly of another branchout coupling.

While the particular fastenerless coupling means for sheet metal ducting and the method of making and assembling the same herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A combined coupling and flow control assembly for use in making a branchout connection between a flat-sided main air duct and a branchout duct, said assembly comprising a one-piece sheet metal cylindrical branchout duct, one end of said branchout duct being formed with an annular bead merging along its outer edge with an outwardly opening relatively deep but narrow groove, said groove having an outer side wall formed by a wide radial flange, said flange being deflected to extend substantially across said groove along substantially the full length thereof, said flange having a notch opening through its rim edge and having its opposed edges skewed away from each other, the wall of said flat-sided main air duct having a circular opening therein sized to seat in the outwardly opening groove in the end of said branchout duct and said circular opening being notched to permit one of the skewed edges of the notch in said flange to be received as said duct is rotated about its own axis and the axis of said circular opening, and said generally radial flange being resilient and being deflected sufficiently while being rotated into assembled position with the main air duct as to provide a snug, resilient and substantially airtight fit without need for fasteners, tools or auxiliary fittings.

2. That method of making branchout coupling assemblies in the field without need for skilled labor, tools and tinsmithing operations which method comprises, forming a cylindrical sheet metal branchout duct including forming one end thereof with an encircling outwardly-opening deep narrow groove sized to seat the thickness of another piece of sheet metal, said groove having a generally radial resilient flange projecting outwardly beyond the opening into said groove and deflected axially of said branchout duct to overlie said groove before assembly to another duct, notching said flange to the bottom of said groove and slightly skewing the edges of said notch away from one another forming a circular opening in the flattened portion of a main air duct and sized to seat in the groove of said cylindrical duct, notching the edge of said circular opening to a depth slightly greater than the radial height of said flange, and assembling said duct to said opening by bringing the flanged end of said duct into abutting registry with said main duct opening and rotating said cylindrical duct about its own axis while deflecting said resilient flange and threading one of said skewed edges through the notch in said circular opening and continuing said rotation and progressively deflecting said resilient flange until the edge of said circular opening is substantially fully seated throughout its length in said outwardly opening groove and with the rim edge of said flange pressing resiliently against the interior surface of said main duct throughout the length of said flange to provide a snug airtight fit therewith.

3. That improved and more economical method of making a highly effective junction between a main air duct and a branchout duct and including performing skilled labor steps in a tinsmith shop and unskilled steps at the installation site, said method comprising forming a tubular branchout duct from sheet metal and with a head encircling one end thereof with its outer edge merging with one edge of an outwardly opening narrow groove having a relatively wide generally radial resilient flange, deflecting said flange to substantially overlie said groove, forming a V-notch in said flange to the bottom of said groove and skewing the edges of said notch slightly in opposite directions and away from one another, transporting said branchout duct to the installation site, there forming a circular opening in the flat side wall of a sheet metal main duct and sized to interlock with the groove in said branchout duct, forming a flaring notch in the edge of said circular opening, bringing the flanged end of said duct into registry with the opening in said main duct while rotating said branchout duct to feed one end of its notched flange through the notch in the edge of said circular opening until said flange is located interiorly of said main duct with its edge resiliently pressed against the interior surface of said main duct along the entire length of said resilient flange.

4. That improved method defined in claim 3 characterized in the step of securing air deflector to the interior of the flanged end of said branchout duct and projecting axially beyond said flanged end prior to transporting the duct to the installation site, and rotating said branchout duct after assembly to said main duct until said air deflector is positioned adjacent the downstream edge of the installed branchout duct and properly positioned for most effective use in deflecting flow from said main duct into said branchout duct.

5. A combined coupling and flow control assembly as defined in claim 1 characterized in that said branchout duct includes an arcuate air-flow deflector secured to and projecting axially beyond said one end of the branchout duct, said branchout duct being rotatable about its junction with said main air duct to position said air flow deflector selectively in different positions relative to the direction of air flow in said main air duct thereby to vary the quantity of air flow into said branchout duct.

6. A combined coupling and flow control assembly as defined in claim 1 characterized in that said branchout duct includes an arcuate air-flow deflector secured to and projecting axially beyond said one end of the branchout duct, said branchout duct being rotatable about its junction with said main air duct to position said air flow deflector in an appropriate position for the most effective deflection of air from said main air duct into said branchout duct.

References Cited

UNITED STATES PATENTS

| | | | |
|---|---|---|---|
| 1,062,635 | 5/1913 | Clements | 285—209 |
| 1,220,267 | 3/1917 | Park | 220—40 |
| 2,228,857 | 1/1941 | Stephenson | 285—424 |
| 2,907,592 | 10/1959 | Bailey | 285—424 |
| 3,109,670 | 11/1963 | Engel | 285—424 |
| 3,152,817 | 10/1964 | Watson | 285—424 |

M. CARY NELSON, *Primary Eaminer.*

W. CLINE, *Assistant Examiner.*